(12) United States Patent
Shen et al.

(10) Patent No.: US 6,276,293 B1
(45) Date of Patent: Aug. 21, 2001

(54) SKIDPLATE HAVING NON-SYMMETRICAL HYDROFOIL PROFILES PRODUCING SKID-OPPOSING SIDE FORCE ONLY DURING TURN MANEUVER

(75) Inventors: Young T. Shen, Potomac, MD (US); Frank B. Peterson, McLean, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/368,183

(22) Filed: Aug. 4, 1999

(51) Int. Cl.⁷ ................................................. B63B 27/00
(52) U.S. Cl. ............................................................ 114/271
(58) Field of Search ................................. 114/271, 274, 114/275, 276, 277, 278, 279, 280, 281, 282

(56) References Cited

U.S. PATENT DOCUMENTS

| 3,915,106 | * | 10/1975 | De Witt | 114/280 |
| 5,551,369 | * | 9/1996 | Shen | 114/274 |

FOREIGN PATENT DOCUMENTS

| 450880 | * | 4/1913 | (FR) | 114/274 |

* cited by examiner

Primary Examiner—Jesus D. Sotelo
(74) Attorney, Agent, or Firm—Jacob Shuster

(57) ABSTRACT

A skidplate projecting into a body of water from a marine craft hull has a symmetric wedge formation extending from the leading edge to differently profiled surfaces on opposite sides of the skidplate producing lift and side force during travel. No side force is however produced during straight line travel by virtue of ventilated cavity enclosure of the profiled surfaces on both sides between cavity establishing streamlines extending through the water from the symmetric wedge formation.

6 Claims, 2 Drawing Sheets

US 6,276,293 B1

SKIDPLATE HAVING NON-SYMMETRICAL HYDROFOIL PROFILES PRODUCING SKID-OPPOSING SIDE FORCE ONLY DURING TURN MANEUVER

The present invention relates generally to hydrofoil structure mounted on marine craft through which hydrodynamic forces are generated during propulsion within a body of water.

BACKGROUND OF THE INVENTION

Marine craft such as high-speed racing boats undergo travel with respect to a body of water which involves both straight runs and 180 degree maneuvering turns. Such turns induce sideway skidding of boats provided with submerged hydrodynamic devices as well as a water surface piercing strut or skidplate through which skid opposing side forces are produced in an effort to avoid sideway skidding experienced at side slip angles of 35° to 45° resulting from centrifugal force produced during typical turning maneuvers. Large drag forces are imposed on the skidplates as well as the rudders by such maneuver activity, to reduce propeller thrust causing significant speed loss as the craft comes out of a turn.

Typical skidplates heretofore utilized had symmetric profiles on opposite sides thereof so as to avoid generation of side force during straight course run. To minimize drag resistance, the typical profiles of such skidplates were in the form of thin flat plates having a wedge formation at its leading edge. Although the use of camber section foils for such skidplates was considered, it was deemed unsuitable because of the large lift coefficient involved during straight line run at a zero angle of attack associated with generation of an undesirably large side force. Accordingly, it is an important object of the present invention to provide a skidplate having profile sections which perform like a camber foil to produce side force only when needed during turn maneuver, and yet perform like a symmetric foil during straight course run without reliance on corrective action of control devices.

SUMMARY OF THE INVENTION

In accordance with the present invention, a skidplate having a symmetric wedge formation at its leading edge, is provided with a non-symmetric arrangement of different profile surface sections extending rearwardly from the wedge formation on opposite foil sides of the skidplate to produce a skid-opposing side force only from one of the foil sides during establishment of a fully ventilated cavity enclosing only the other foil side of the skidplate, such cavity being formed by a water streamline extending from the wedge formation during turn maneuvering travel. Smaller ventilated cavities of equal size are formed on both foil sides of the skidplate by water streamlines produced during straight line travel of the skidplate, so that the profile surface sections on both foil sides of the skidplate then act like symmetric foils to avoid generation of any side force. The different surface profiles of both foil sides of the skidplate include surface sections spaced apart by a maximum amount equal to or greater than the width established by the wedge formation at the leading edge. Such profile surface arrangement is responsible for more efficient generation of lift force generated during skidplate travel, as compared to flat surface sides of conventional skidplates heretofore utilized.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
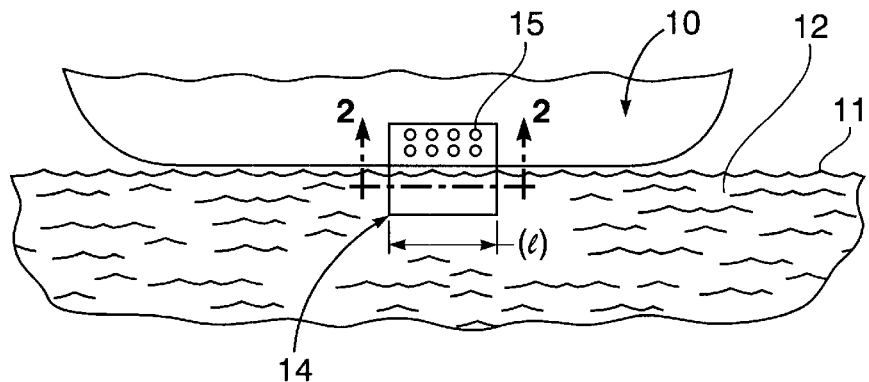
FIG. 1 is a partial side elevation view of the hull of a marine craft within a body of water, having a skidplate projecting therefrom into the water.

Referring now to the drawing in detail, FIG. 1 illustrates a hull 10 of a marine craft, such as a high-speed racing boat slightly above the water line 11 of a body of water 12 during travel, as the environment for a submerged skidplate 14 attached by fasteners 15 to and projecting downwardly from one side of the hull 10 into the body of water. Typically, the skidplate associated with the hull of such a boat is a thin water piercing strut in the form of a thin flat plate of uniform thickness (t) equal to the width of a symmetric wedge formation at its leading edge. The size of such a flat type of skidplate in terms of its thickness (t) and length (l) as denoted in FIG. 1, is selected in accordance with prior art cavity flow theory to minimize the drag force induced during high speed turn of the hull and to satisfy structural strength requirements based on expected side forces on the skidplate during hull maneuver. Based on use of such selected dimensions of thickness (t) and length (l) in the direction of travel for a corresponding flat surface type of prior art skidplate, foil surface profiles of the skidplate 14 are designed in accordance with the present invention as hereinafter explained.

Figure 2:
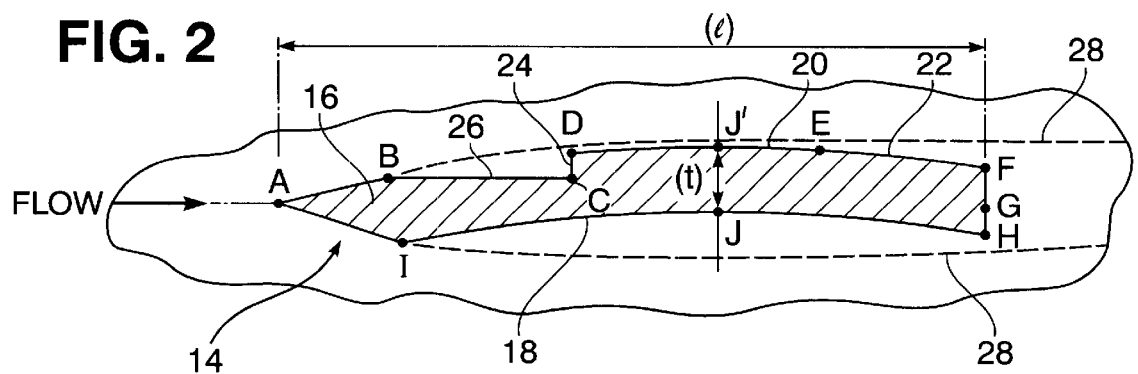
FIG. 2 is a section view taken substantially through a plane indicated by section line 2—2 in FIG. 1, showing surface profiling on a cross-section of the skidplate during straight course travel run.
Figure 2A:
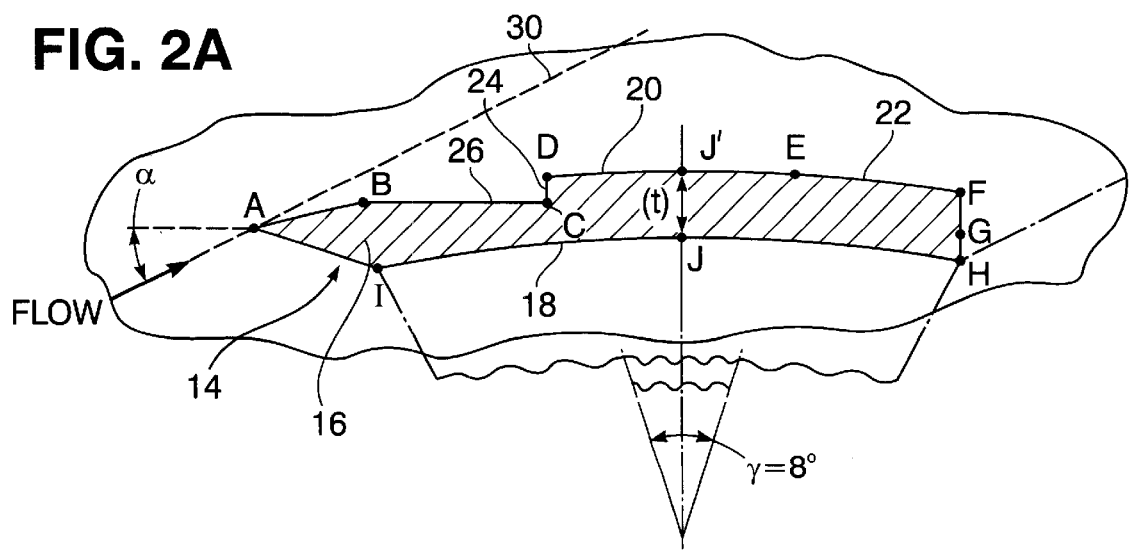
FIG. 2A is a section view similar to FIG. 2 showing the skidplate during turn maneuvering travel.

As shown in FIGS. 2 and 2A, various surface points A, B, C, D, E, F, G, H, I, J and J' on the cross-sectionally depicted surfaces of the skidplate 14 are designated, in order to define foil surface profiles on opposite sides of the skidplate 14 of a length (l). The surface points A, B and I define a relatively small wedge-shaped symmetric leading edge portion 16 of the skidplate having straight line sides $\overline{AB}$ and $\overline{AI}$ extending from forward point A to a wedge width $\overline{BI}$ equal to the thickness (t). From the surface point I, a camber foil surface section 18 on one side of the skidplate between points I and H is formed from a portion of a circular arc having a central angle γ equal to 8°, as designated in FIG. 2A. Thus, the profile of one side surface of the skidplate 14 of length (l) is formed by the straight line $\overline{AI}$ of the symmetric leading edge portion 16 and the circular arc surface section having a central camber high point J. A curved surface section 20 between surface points D and E, of shorter length than camber surface section 18, is also formed on the other profiled side of the skidplate. Such curved surface section 20 has a central high point J' thereon, laterally spaced from the high point J on the camber surface section 18 by a maximum width of the skidplate equal to or greater than the thickness (t). The length of such surface section 20 is approximately one-half the distance between the point B at the rear end of leading edge portion 16 and the rear end of the skidplate at point F. Between points E and F a rear end surface section 22 is formed in angular relation to surface section 20 of a length selected to determine a spacing between points G and H at the rear end of the skidplate so as to enhance lift force generation. As to the forward end of the surface section 20 at point D, a short lateral surface section 24 terminates the rear end of a straight line section 26 at point C, extending from the leading edge portion 16 of the skidplate. The length of the lateral surface section 24 is approximately ¼ of the profile distance BF from the leading edge portion 16.

As hereinbefore indicated, the thickness (t) between wedge points B and I of the leading edge portion 16 is selected so as to minimize drag force. Also because of the discontinuity of the surface profiles from points B and I, flow will separate therefrom during straight run travel at a zero angle of attack of the skidplate 14 through the fluid medium 12 as shown in FIG. 2. Fully ventilated cavities within the fluid medium between cavity streamlines 28 extending rearwardly from the wedge points B and I is then established at high speeds in excess of 50 mph, with lift efficiently generated by the camber surface section 18. Side forces are only produced during turning maneuver to counter centrifugal forces, involving flow at an angle of attack α as denoted in FIG. 2A producing a cavity streamline 30 only on one side of the skidplate 14. The surface profile on the side of the skidplate formed by surface sections 26, 24, 20 and 22 is located within the fully ventilated cavities formed by the streamline 30 so as to have no effect on hydrodynamic performance of the skidplate. Thus, only the profile foil on the other side of the skidplate formed by camber surface section 18 will efficiently provide lift force with an enhanced further lift generation capability.

Figure 3:
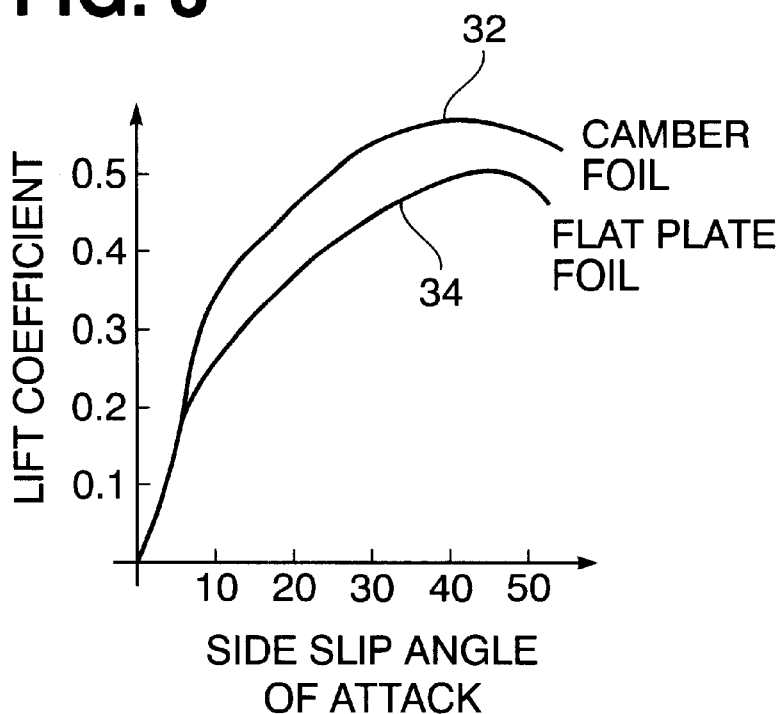
FIGS. 3 and 4 are graphical comparisons of performance characteristics respectively associated with the camber foil skidplate shown in FIGS. 2 and 2A and corresponding flat surface skidplates.
Figure 4:
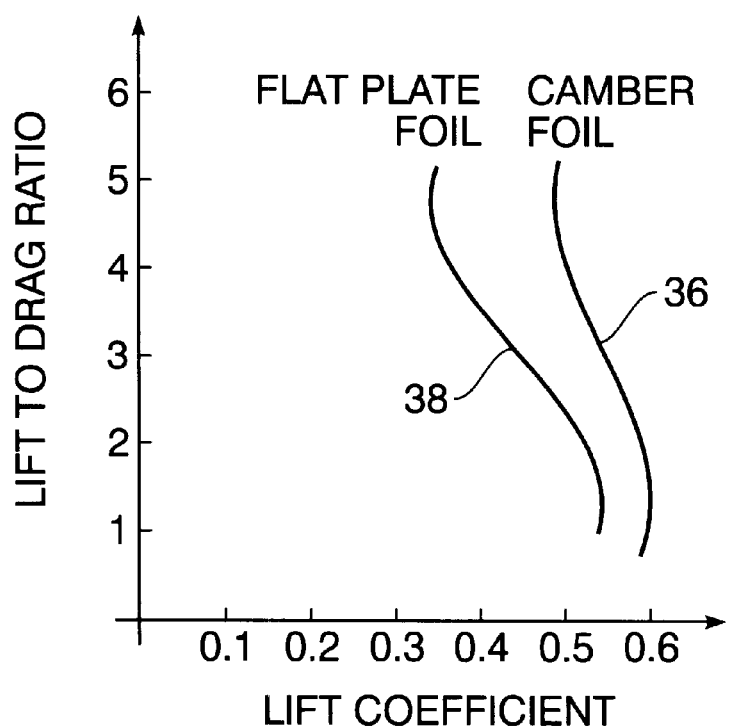

The improved lift capability of the skidplate 14 with the surface profiles hereinbefore described, in comparison with a corresponding flat foil surface type of skidplate is graphically depicted in FIG. 3, plotting lift coefficient vs. side slip angle of attack for the camber foil on skidplate 14 as curve 32, and for that of a flat plate foil of a conventional skidplate as curve 34. A comparison of the variation in lift coefficient vs. lift to drag ratio is shown in FIG. 4 by plotted curves 36 and 38 for the camber foil shown in FIGS. 2 and 2A and the corresponding flat foil, respectively. Thus, FIG. 4 indicates that for the same lift coefficient, the lift to drag ratio of the skidplate 14 is much greater than that of the conventional flat plate foil skidplate because of more efficient side force generation.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a craft propelled through a fluid medium, a skidplate fixed to the craft and projecting therefrom into the fluid medium, having a leading edge and hydrofoil surface means extending rearwardly therefrom for producing lift and side force in response to travel of the skidplate through the fluid medium, said hydrofoil surface means comprising: differently profiled surfaces on opposite sides of the skidplate; and symmetric wedge means extending from the leading edge to said surfaces in symmetrical relation to a straight line path of said travel for establishing cavity forming streamlines within the fluid medium enclosing both of the surfaces only during said travel along said straight line path to avoid generation of the side force.

2. The hydrofoil surface means as defined in claim 1 wherein said symmetric wedge means is formed between the leading edge and straight line and curved surface sections of the differently profiled surfaces, and extending in diverging relation to each other from the leading edge to establish a predetermined minimum limit on maximum spacing between the differently profiled surfaces.

3. The hydrofoil surface means as defined in claim 2 wherein said surfaces respectively include arcuate sections of different length along said straight line travel path having high points aligned along a location at which said maximum spacing between the surfaces is established, one of said arcuate sections being a camber surface.

4. The hydrofoil surface means as defined in claim 1 wherein said surfaces respectively include arcuate sections of different length along said straight line travel path, said arcuate sections having high points aligned along a location of maximum spacing between the surfaces.

5. In combination with a craft propelled through a fluid medium, a skidplate fixed to the craft and projecting therefrom into the fluid medium, having a leading edge and hydrofoil surface means extending rearwardly therefrom for producing lift and side force in response to travel of the skidplate through the fluid medium, said hydrofoil surface means comprising: differently profiled surfaces on opposite sides of the skidplate; and wedge means extending from the leading edge to said differently profiled surfaces in symmetrical relation to a straight line travel path for establishing cavity forming streamlines within the fluid medium enclosing both of the surfaces only during said travel along said straight line travel path to avoid generation of the side force.

6. The hydrofoil surface means as defined in claim 5 wherein said wedge means is formed between the leading edge and straight line and curved surface sections of the differently profiled surfaces, and extending in diverging relation to each other from the leading edge to establish a predetermined minimum limit on maximum spacing between the differently profiled surfaces.

\* \* \* \* \*